US008738279B2

(12) United States Patent
Radhakrishnan

(10) Patent No.: US 8,738,279 B2
(45) Date of Patent: May 27, 2014

(54) ELECTRONICALLY LOCATING CONTACTS BASED ON INTENDED TRAVEL DESTINATIONS

(75) Inventor: Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 13/421,980

(22) Filed: Mar. 16, 2012

(65) Prior Publication Data

US 2013/0245928 A1 Sep. 19, 2013

(51) Int. Cl.
*G05D 1/02* (2006.01)

(52) U.S. Cl.
USPC .......................................... 701/300; 709/201

(58) Field of Classification Search
USPC ................... 701/300; 709/201, 202, 204, 218
See application file for complete search history.

(56) References Cited

U.S. PATENT DOCUMENTS

2008/0256170 A1 10/2008 Hayashi et al.
2009/0248457 A1 10/2009 Munter et al.
2010/0313142 A1 12/2010 Brown
2010/0317392 A1 12/2010 Davis et al.
2011/0238755 A1 9/2011 Khan et al.
2012/0003989 A1 1/2012 Gravino

OTHER PUBLICATIONS

"The Dopplr Tour", 2012, 3 pages, No authors cited. http://www.dopplr.com.
"Share your trips and stay connected", Triplt, 2012, 2 pages, No authors cited. http://tripit.com.

*Primary Examiner* — Thomas Black
*Assistant Examiner* — Luke Huynh
(74) *Attorney, Agent, or Firm* — William E. Schiesser; Hunter E. Webb; Keohane & D'Alessandro PLLC

(57) ABSTRACT

Embodiments of the present invention provide an approach for locating connections/contacts of a user of social networking websites based on an intended travel destination of the user. Specifically, embodiments of the present invention will analyze a set of online resources (e.g., travel websites, social networking services, calendaring programs, etc.) to identify one or more travel profiles (e.g., reservations) associated with the user. Based on one or more intended destinations set forth in the travel profile(s), social networking websites associated with the user may be analyzed to identify and locate contacts/connections of the user that are located within a predetermined proximity of the intended destination(s). Once such contacts have been identified, the user may be provided with a notification that identifies the contact and provides the contact's location.

19 Claims, 4 Drawing Sheets

ELECTRONICALLY LOCATING CONTACTS BASED ON INTENDED TRAVEL DESTINATIONS

TECHNICAL FIELD

In general, embodiments of the present invention relate to the locating of contacts/connections. Specifically, embodiments of the present invention relate to the locating of contacts/connections using social media and other electronic resources based on an intended travel destination of a user.

BACKGROUND

Social networking websites have become an everyday part of many Internet users' lives. Specifically, social networking websites exist for business purposes and/or recreational purposes. These websites may provide a way for users to communicate with present and/or former contacts. Challenges may exist, however, in utilizing such websites to facilitate in person meetings between users.

SUMMARY

In general, embodiments of the present invention provide an approach for locating connections/contacts of a user of social networking websites based on an intended travel destination of the user. Specifically, embodiments of the present invention will analyze a set of online resources (e.g., travel websites, social networking services, calendaring programs, etc.) to identify one or more travel profiles (e.g., reservations) associated with the user. Based on one or more intended destinations set forth in the travel profile(s), social networking websites associated with the user may be analyzed to identify and locate contacts/connections of the user that are located within a predetermined proximity of the intended destination(s). Once such contacts have been identified, the user may be provided with a notification that identifies the contact and provides the contact's location.

A first aspect of the present invention provides a computer-implemented method for locating contacts based on travel destinations, comprising: determining a travel destination for a user; determining locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and notifying the user of the locations of the set of contacts.

A second aspect of the present invention provides a system for locating contacts based on travel destinations, comprising: a memory medium comprising instructions; a bus coupled to the memory medium; and a processor coupled to the bus that when executing the instructions causes the system to: determine a travel destination for a user; determine locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and notify the user of the locations of the set of contacts.

A third aspect of the present invention provides a computer program product for locating contacts based on travel destinations, the computer program product comprising a computer readable storage media, and program instructions stored on the computer readable storage media, to: determine a travel destination for a user; determine locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and notify the user of the locations of the set of contacts.

A fourth aspect of the present invention provides a method for deploying a system for locating contacts based on travel destinations, comprising: providing a computer infrastructure being operable to: determine a travel destination for a user; determine locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and notify the user of the locations of the set of contacts.

BRIEF DESCRIPTION OF THE DRAWINGS

These and other features of this invention will be more readily understood from the following detailed description of the various aspects of the invention taken in conjunction with the accompanying drawings in which.

Figure 1:
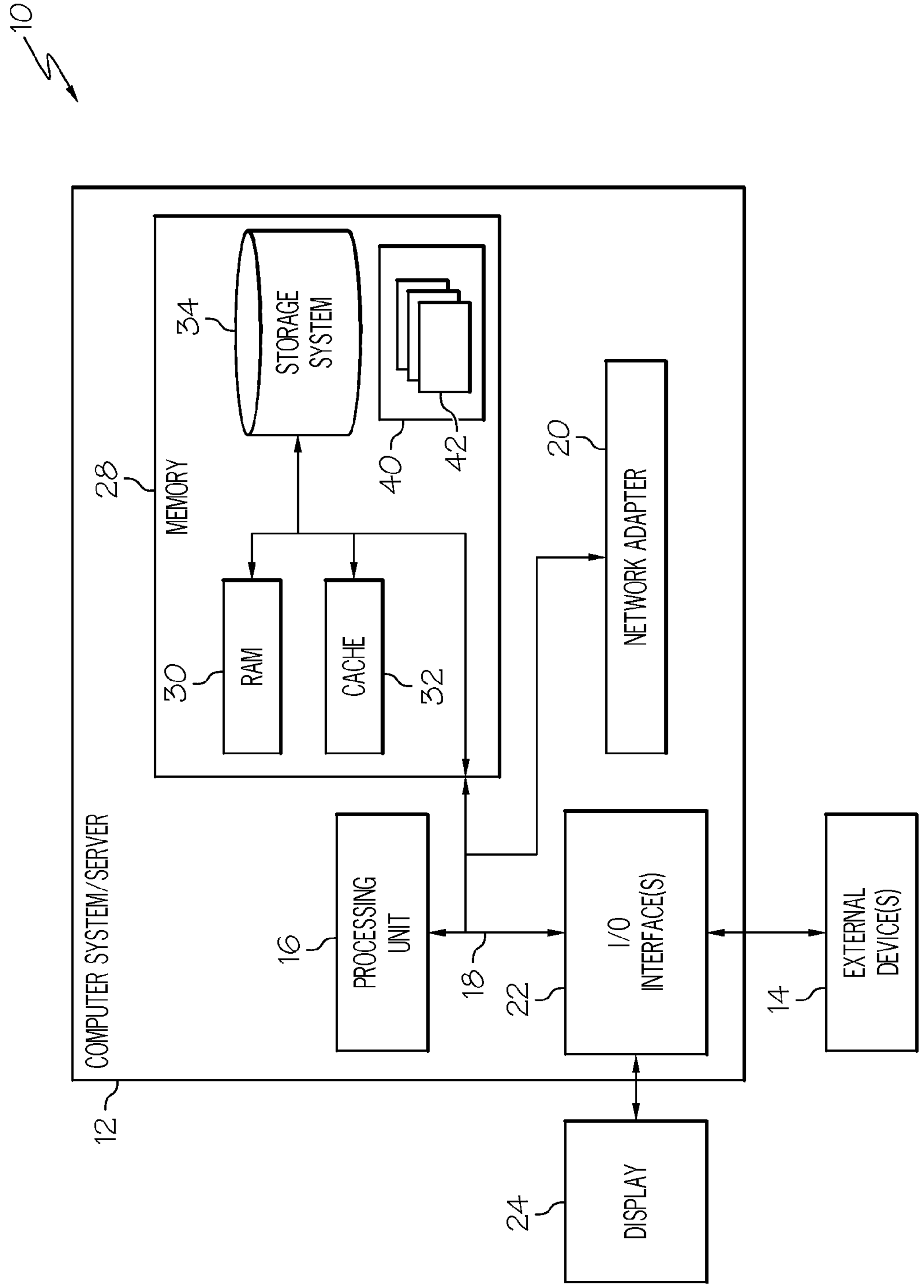
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention provide an approach for locating connections/contacts of a user of social networking websites based on an intended travel destination of the user. Specifically, embodiments of the present invention will analyze a set of online resources (e.g., travel websites, social networking services, calendaring programs, etc.) to identify one or more travel profiles (e.g., reservations) associated with the user. Based on one or more intended destinations set forth in the travel profile(s), social networking websites associated with the user may be analyzed to identify and locate contacts/connections of the user that are located within a predetermined proximity of the intended destination(s). Once such contacts have been identified, the user may be provided with a notification that identifies the contact and provides the contact's location.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Contact location program/utility 40, having a set (at least one) of program modules 42, may be stored in memory 28 by way of example, and not limitation, as well as an operating system, one or more application programs, other program modules, and program data. In general, transaction authorization program 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
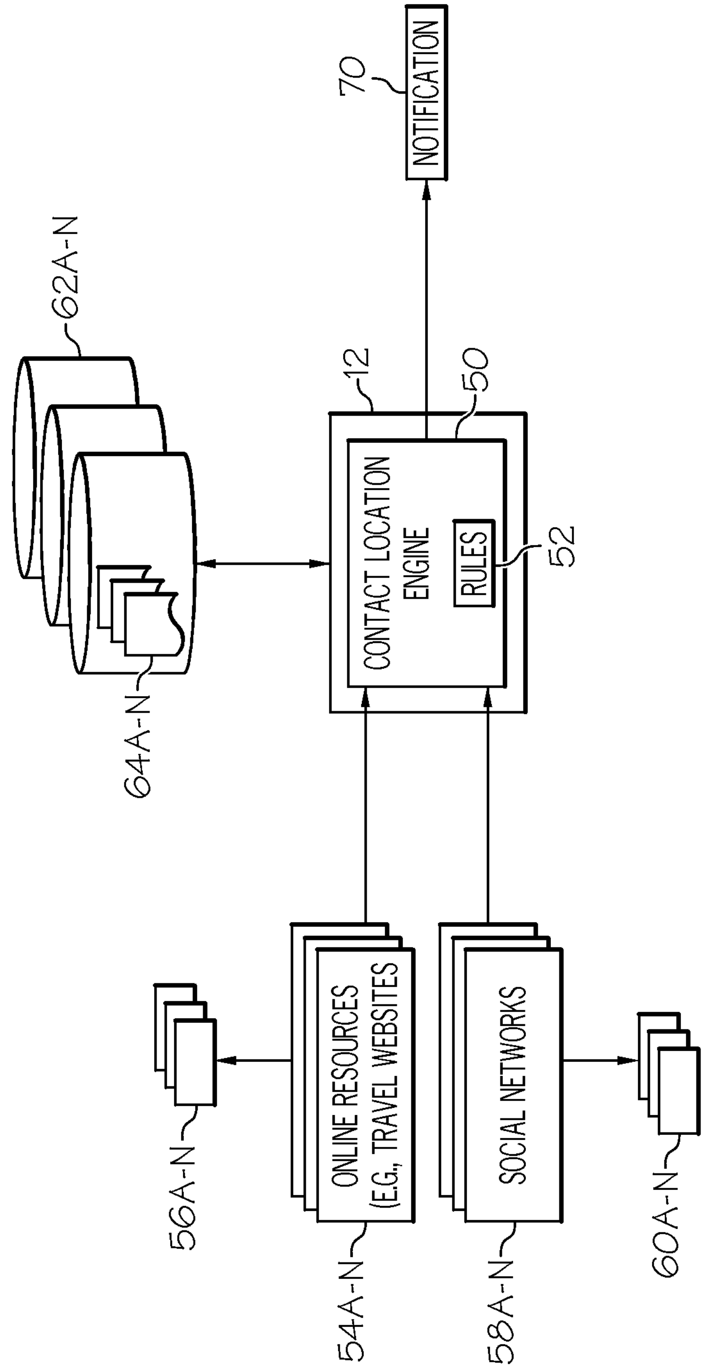
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A stand-alone computer system/server 12 is shown in FIG. 1 for simplicity purposes only. In the event the teachings recited herein are practiced in a networked computing environment, each client need not have a contact location engine (engine 50). Rather, engine 50 could be loaded on a server (e.g., payment processing server) or server-capable device that communicates (e.g., wirelessly) with the clients to provide credit transaction authorization functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides contact location functionality hereunder.

Along these lines, engine 50 may perform multiple functions similar to a general-purpose computer. Specifically, among other functions, engine 50 may (among other things): access a set of online resources 54A-N (e.g., travel websites, social networking services, calendaring programs, etc.); identify at least one travel profile 56A-N (e.g., travel reservation(s)) associated with the user from the set of online resources 54A-N; determine a travel destination for the user; determine locations of a set of contacts 60A-N associated with the user that are within a predetermined proximity of the travel destination (e.g., based on. a set of social networking services 58A-N utilized by the user and the set of contacts 60A-N, or previous electronic communications 64A-N (e.g., emails, text messages, instant messages, etc.) between the user and the set of contacts 60A-N stored in at least one computer storage device 62A-N; and notify 70 the user of locations of the set of contacts 60A-N; and/or update the locations of the set of contacts 60A-N as the locations change (e.g., via an electronic mail message, an instant message, a text message, a voice mail, etc). The notification may comprise details of the previous exchanges between the user and the set of contacts 60A-N, details pertaining to the location of the set of contacts 60A-N, etc.

Figure 3:
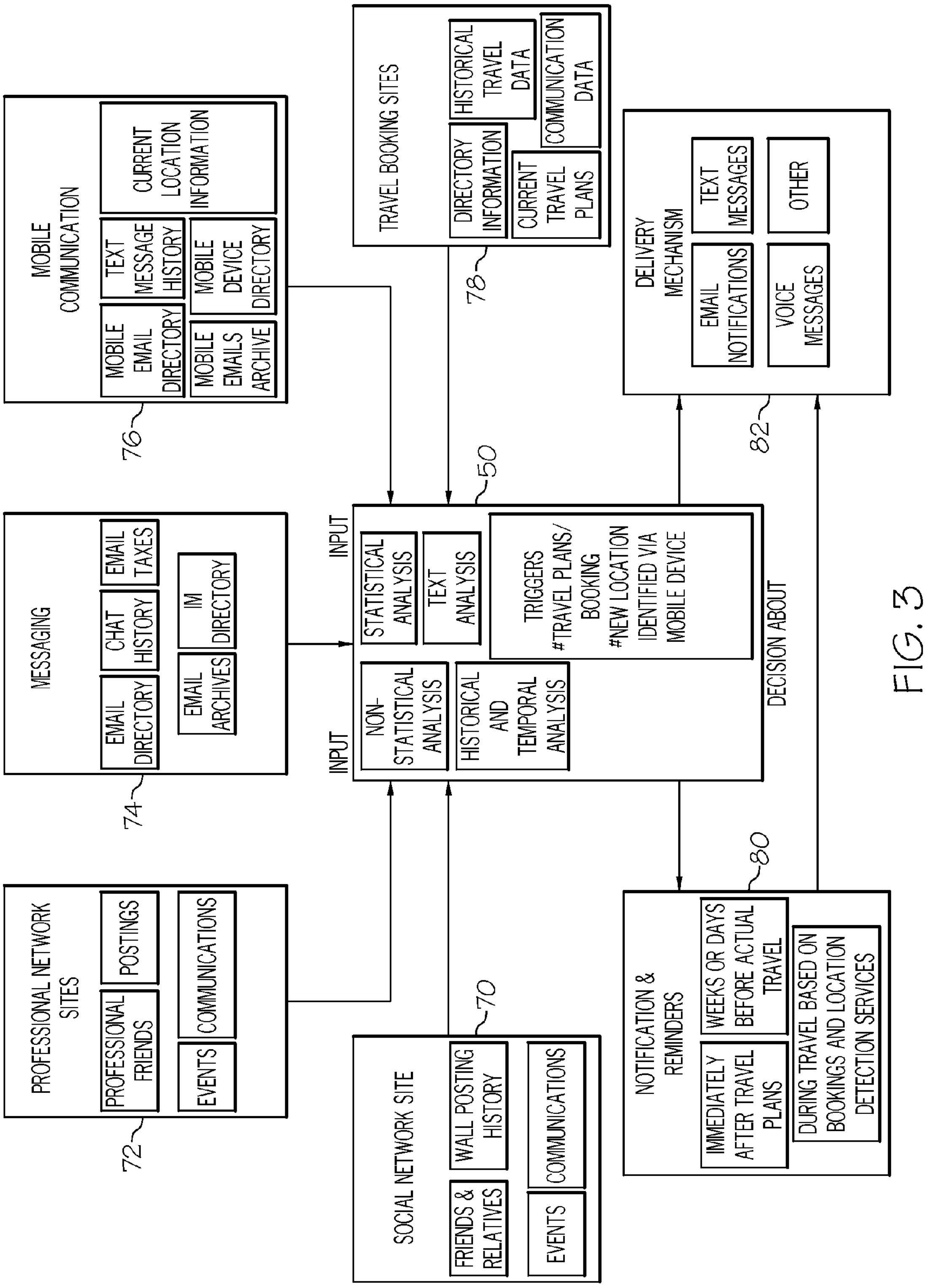
FIG. 3 depicts a logic flow diagram according to an embodiment of the present invention.

Referring now to FIG. 3, a logic flow diagram according to an embodiment of the present invention is shown. As shown, engine 50 may receive various types of input to determine intended travel destinations of users, identify contacts associated with the users that are located within a predetermined proximity of the intended travel destinations, provide notifications to the user with such details (locations of the users, details of previous electronic communications between the users and their contacts, updates when locations of the users and/or their contacts change, etc.).

Specifically, as shown, engine 50 may receive the input from the following sources:

- Social networking websites 70 that may provide information such as friends and relatives, wall postings, events, communications, etc.;
- Professional networking websites 72 that may provide information such as professional friends/contacts, postings, events, communications, etc.;
- Messaging programs 74 that may provide information such as email directory information, chat histories, email traces, email archives, instant messaging directories, etc.;
- Mobile communication tools 76 that may provide information such as mobile email directories, text messaging histories, current location information, mobile email archives, mobile device directories, etc.; and/or
- Travel booking websites 78 that may provide information such as travel profiles, directory information, historical travel data, current travel plans (e.g., schedules, and/or destinations), and/or communications data.

Using this input, engine 50 will perform the functions of the embodiments of the present invention as set forth above using a set of analyses. Such analyses may include (among others), a non-statistical analysis (e.g., calendar, and/or contact mining), a statistical analysis (e.g., frequency of travel, frequency of destinations, frequency of communications with contacts, etc.), a text analysis (e.g., to determine destinations from calendaring programs, email messages, and/or text messages), a historical and/or temporal analysis (e.g., when and where do users historically tend to travel and/or communicate with contacts), and various triggers/events (e.g., travel plans/bookings, new locations identified, etc.). Based on these analyses and inputs, engine 50 will: determine travel destinations, identify contacts within predetermined proximities of the travel destinations, and provide notifications/reminder 80 pertaining thereto. As shown, such notifications/reminder 80 may comprise various types of information such as immediate travel plans, weeks/days before actual travel occurs, travel destinations/booking information, location data of contacts, updates, etc. Such notifications/reminders 80 may be delivered via delivery mechanism 82 by various methods such as email notifications, text messages, a user interface (wall posting, email message, instant message, etc.) at the social networking service, or a voice mail, etc. Moreover, if contacts locations change, the user can be provided with updates via the same delivery mechanisms. It is understood that a user may utilize a user interface of a social networking service/website for any of these functions. In one embodiment, an application may be provided by a provider of a social networking service/website so that a user may locate contacts at potential travel destinations. For example, a user could enter a potential travel destination and be provided with a list and/or map showing locations of contacts in proximity to the potential destination.

Figure 4:
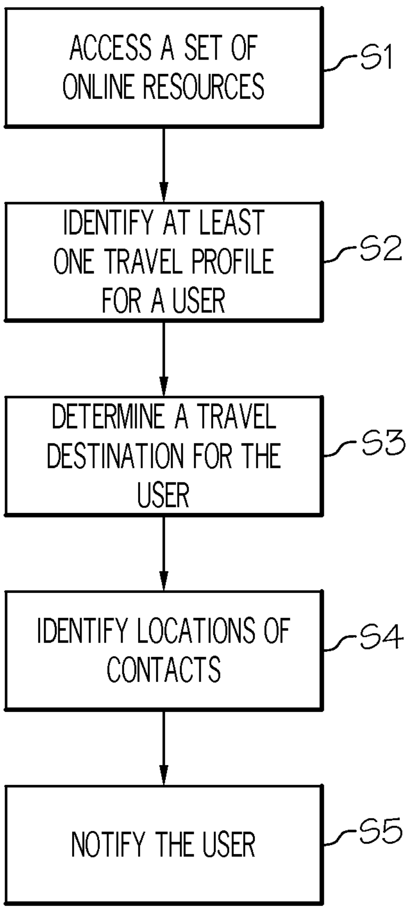
FIG. 4 depicts a method flow diagram according to an embodiment of the present invention.

Referring now to FIG. 4, a method flow diagram according to an embodiment of the present invention is shown (e.g., as enabled by engine 50 of FIG. 2). As depicted, in step S1, a set of online resources is accessed. In step S2, at least one travel profile associated with the user is identified from the set of online resources. In step S3, a travel destination is determined for the user from the at least one travel profile. In step S4, locations of a set of contacts associated with the user that are within a predetermined proximity of the travel destination are determined. In a typical embodiment, the set of contacts may be identified based on at least one of the following: a set of social networking services utilized by the user and the set of contacts, or previous electronic communications between the user and the set of contacts stored in at least one computer storage device. In step S5, the user is notified of the locations of the set of contacts.

While shown and described herein as a contact location determination solution, it is understood that the invention further provides various alternative embodiments. For example, in one embodiment, the invention provides a computer-readable/useable medium that includes computer program code to enable a computer infrastructure to provide contact location determination functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide contact location determination functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method contact location determination. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for locating contacts based on travel destinations, comprising:
- determining a travel destination for a user by accessing a set of travel websites; and identifying at least one travel profile associated with the user from the set of travel websites;
- determining locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and
- notifying the user of the locations of the set of contacts.

2. The computer-implemented method of claim 1, further comprising updating the locations of the set of contacts as the locations change.

3. The computer-implemented method of claim 1, the social networking services comprising a locator service.

4. The computer-implemented method of claim 1, the notification comprising at least one of the following: an electronic mail message, an instant message, a text message, a user interface at the social networking service, or a voice mail.

5. The computer-implemented method of claim 1, the notification comprising details of the previous electronic communications between the user and the set contacts.

6. The computer-implemented method of claim 1, the previous electronic communications comprising at least one of the following: electronic mail messages exchanged between the user and the set of contacts, or social networking interactions between the user and the set of contacts.

7. A system for locating contacts based on travel destinations, comprising:
- a memory medium comprising instructions;
- a bus coupled to the memory medium; and
- a processor coupled to the bus that when executing the instructions causes the system to:
  - determine a travel destination for a user by accessing a set of travel websites; and identifying at least one travel profile associated with the user from the set of travel websites;

determine locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and notify the user of the locations of the set of contacts.

8. The system of claim 7, the previous electronic communications comprising at least one of the following: electronic mail messages exchanged between the user and the set of contacts, or social networking interactions between the user and the set of contacts.

9. The system of claim 7, the memory medium further comprising instructions for causing the system to update the locations of the set of contacts as the locations change.

10. The system of claim 7, the social networking services comprising a locator service.

11. The system of claim 7, the notification comprising at least one of the following: an electronic mail message, an instant message, a text message, a user interface at the social networking service, or a voice mail.

12. The system of claim 7, the notification comprising details of the previous electronic communications between the user and the set contacts.

13. A computer program product for locating contacts based on travel destinations, the computer program product comprising a computer readable storage media, and program instructions stored on the computer readable storage media, which, when executed by a computer device, causes the computer device to:

determine a travel destination for a user by accessing a set of travel websites; and identifying at least one travel profile associated with the user from the set of travel websites;

determine locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and notify the user of the locations of the set of contacts.

14. The computer program of claim 13, the notification comprising details of the previous electronic communications between the user and the set contacts.

15. The computer program of claim 13, the previous electronic communications comprising at least one of the following: electronic mail messages exchanged between the user and the set of contacts, or social networking interactions between the user and the set of contacts.

16. The computer program of claim 13, the computer readable storage media further comprising instructions to update locations of the set of contacts as the locations change.

17. The computer program of claim 13, the social networking services comprising a locator service.

18. The computer program of claim 13, the notification comprising at least one of the following: an electronic mail message, an instant message, a text message, a user interface at the social networking service, or a voice mail.

19. A method for deploying a system for locating contacts based on travel destinations, comprising:

providing a computer infrastructure being operable to:

determine a travel destination for a user by accessing a set of travel websites; and identifying at least one travel profile associated with the user from the set of travel websites;

determine locations of a set of contacts associated with the user that are within a predetermined proximity of the travel destination, the set of contacts being identified based on at least one of the following: a set of social networking services utilized by the user and the set of contacts, or previous electronic communications between the user and the set of contacts stored in at least one computer storage device; and notify the user of the locations of the set of contacts.

* * * * *